(12) United States Patent
Ahmad et al.

(10) Patent No.: US 11,770,717 B2
(45) Date of Patent: *Sep. 26, 2023

(54) SYSTEMS AND METHODS FOR DESIGNING A DISTRIBUTED MIMO NETWORK

(71) Applicant: Telefonaktiebolaget LM Ericsson (publ), Stockholm (SE)

(72) Inventors: Hazik Ahmad, Whitby (CA); Aroosh Elahi, Gloucester (CA); Ramy H. Gohary, North Gower (CA); Ioannis Lambadaris, Ottawa (CA); Emmanouil Skevakis, Gatineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 139 days.

This patent is subject to a terminal disclaimer.

(21) Appl. No.: 17/056,528

(22) PCT Filed: Apr. 24, 2019

(86) PCT No.: PCT/IB2019/053393
§ 371 (c)(1),
(2) Date: Nov. 18, 2020

(87) PCT Pub. No.: WO2019/220243
PCT Pub. Date: Nov. 21, 2019

(65) Prior Publication Data
US 2021/0211884 A1 Jul. 8, 2021

Related U.S. Application Data

(60) Provisional application No. 62/673,430, filed on May 18, 2018.

(51) Int. Cl.
*H04W 16/12* (2009.01)
*H04B 7/0413* (2017.01)
*H04W 16/18* (2009.01)

(52) U.S. Cl.
CPC .......... *H04W 16/12* (2013.01); *H04B 7/0413* (2013.01); *H04W 16/18* (2013.01)

(58) Field of Classification Search
CPC .... H04W 16/12; H04W 16/18; H04B 7/0413; H04B 7/024
See application file for complete search history.

(56) References Cited

U.S. PATENT DOCUMENTS

| 7,085,697 B1 | 8/2006 | Rappaport et al. |
| 2006/0280262 A1 | 12/2006 | Malladi |

(Continued)

FOREIGN PATENT DOCUMENTS

| CN | 102098689 A | 6/2011 |
| WO | 2012000032 A1 | 1/2012 |
| WO | 2019220244 A1 | 11/2019 |

OTHER PUBLICATIONS

Office Action for Taiwanese Patent Application No. 108117018, dated Jan. 22, 2022, 9 pages.

(Continued)

*Primary Examiner* — Kabir A Timory
(74) *Attorney, Agent, or Firm* — Withrow & Terranova, PLLC

(57) ABSTRACT

Systems and methods for determining an assignment of radio resources to antennas are provided. In some embodiments, a method includes obtaining an antenna deployment including antennas and corresponding locations for the antennas; determining a cell assignment for the antennas such that each antenna is assigned to one cell out of one or more cells; and, based on the cell assignment, determining a resource assignment for the antennas such that each antenna is assigned to one radio resource out of one or more radio resources. In this way, some embodiments disclosed herein provide a lightweight and efficient method to design a distributed antenna deployment. In some embodiments, the (Continued)

resulting network is optimized in terms of the total area where a high rank is achieved.

27 Claims, 10 Drawing Sheets

(56) References Cited

U.S. PATENT DOCUMENTS

| | | |
|---|---|---|
| 2010/0067435 A1 | 3/2010 | Balachandran et al. |
| 2010/0166098 A1 | 7/2010 | Luz et al. |
| 2012/0322492 A1 | 12/2012 | Koo et al. |
| 2013/0183961 A1 | 7/2013 | Bassiri et al. |
| 2015/0215020 A1* | 7/2015 | Kim .................. H04W 74/002 370/329 |

OTHER PUBLICATIONS

Notice of Allowance for U.S. Appl. No. 17/056,666, dated Mar. 17, 2022, 9 pages.

International Search Report and Written Opinion for International Patent Application No. PCT/IB2019/053393, dated Sep. 12, 2019, 15 pages.

Written Opinion for International Patent Application No. PCT/IB2019/053393, dated Apr. 8, 2020, 8 pages.

International Preliminary Report on Patentability for International Patent Application No. PCT/IB2019/053393, dated Jul. 7, 2020, 23 pages.

International Search Report and Written Opinion for International Patent Application No. PCT/IB2019/053395, dated Aug. 27, 2019, 14 pages.

Written Opinion for International Patent Application No. PCT/IB2019/053395, dated Feb. 27, 2020, 5 pages.

International Preliminary Report on Patentability for International Patent Application No. PCT/IB2019/053395, dated Aug. 4, 2020, 37 pages.

\* cited by examiner

SYSTEMS AND METHODS FOR DESIGNING A DISTRIBUTED MIMO NETWORK

RELATED APPLICATIONS

This application is a 35 U.S.C. § 371 national phase filing of International Application No. PCT/IB2019/053393, filed Apr. 24, 2019, which claims the benefit of provisional patent application Ser. No. 62/673,430, filed May 18, 2018, the disclosures of which are hereby incorporated herein by reference in their entireties.

TECHNICAL FIELD

The disclosure relates to designing wireless communications, and in particular, to designing Multiple-Input and Multiple-Output (MIMO) networks.

BACKGROUND

Planning products can be used to design network deployments. Some enable the automation of some of the planning process, significantly reducing planning times. Some planning products enable users to import a floor plan and use it to create a plan for the locations of network products and associated cabling. Users can modify several floor attributes including wall materials and structures to produce more accurate planning results. Users can also modify node locations to suit their own situation. Output from the tool sometimes includes a coverage report, a Bill of Materials to help in ordering, and a solution report listing the required hardware and cabling on each floor of the building.

There currently exist solutions for designing Multiple-Input and Multiple-Output (MIMO) networks where antennas are placed in very close proximity (approximately a few centimeters apart).

Existing solutions are not capable of designing a MIMO network where antennas are distributed (i.e. placed far apart from each other) or optimizing the assignment of radio resources to antennas. As such, additional ways of determining an assignment of radio resources to antennas are needed.

SUMMARY

Systems and methods for determining an assignment of radio resources to antennas are provided. In some embodiments, a method includes obtaining an antenna deployment including antennas and corresponding locations for the antennas; determining a cell assignment for the antennas such that each antenna is assigned to one cell out of one or more cells; and, based on the cell assignment, determining a resource assignment for the antennas such that each antenna is assigned to one radio resource out of one or more radio resources.

The proposed solution uses an antenna deployment that guarantees a specific Signal-to-Noise-Ratio (SNR) or Signal-to-Interference-plus-Noise Ratio (SINR) in up to X % of a given area. Radio resources are assigned to individual antennas to maximize the total area where N×N Multiple-Input and Multiple-Output (MIMO) can be achieved. Some embodiments disclosed herein describe a MIMO network design where antennas are distributed in a given area and the radio resource to antenna assignment is optimized to increase the total areas where a high rank is achieved.

There are, proposed herein, various embodiments which address one or more of the issues disclosed herein. In some embodiments, the method includes the step of calculating a performance metric of the antenna deployment based on the cell assignment and the resource assignment for the plurality of antennas in the antenna deployment.

In some embodiments, obtaining the antenna deployment comprises receiving the antenna deployment. In some embodiments, obtaining the antenna deployment comprises determining the antenna deployment by the computation node.

In some embodiments, determining the cell assignment for the plurality of antennas comprises: determining a source antenna and assigning a closest antenna to the source antenna to the cell corresponding to the source antenna. In some embodiments, the determining and assigning steps are repeated until each of the plurality of antennas is assigned to one cell out of one or more cells.

In some embodiments, determining the source node comprises: when none of the plurality of antennas is assigned to a cell, determining a most remote antenna to be the source antenna; and when at least one of the plurality of antennas is assigned to a cell, determining an antenna that is closest to all assigned antennas of the plurality of antennas to be the source antenna.

In some embodiments, a proximity of a first antenna to a second antenna is based on a physical location of the first antenna and the second antenna. In some embodiments, the proximity of the first antenna to the second antenna is based on a propagation property of at least one of the first antenna and the second antenna.

In some embodiments, assigning the closest antenna to the source antenna to the cell corresponding to the source antenna further comprises basing the assignment on a maximum number of antennas for a given cell.

In some embodiments, determining the cell assignment for the plurality of antennas further comprises regrouping the plurality of antennas using a variation of the K-means algorithm based on proximity of the plurality of antennas.

In some embodiments, determining the resource assignment for the plurality of antennas comprises, for one cell out of the one or more cells: determining a best antenna in the one cell; assigning the best antenna to one radio resource out of the one or more radio resources that corresponds to a first data stream; and for each of the other unassigned antennas of the plurality of antennas, assigning one of the other unassigned antennas of the plurality of antennas to a radio resource out of one or more radio resources that optimizes rank in the covered area. In some embodiments, the determining and assigning steps are repeated until each of the one or more cells has been processed.

In some embodiments, the determining the best antenna in the one cell comprises determining the best antenna in the one cell based on propagation properties of the plurality of antennas.

In this way, some embodiments disclosed herein provide a lightweight and efficient method to design a distributed antenna deployment. In some embodiments, the resulting network is optimized in terms of the total area where a high rank is achieved.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
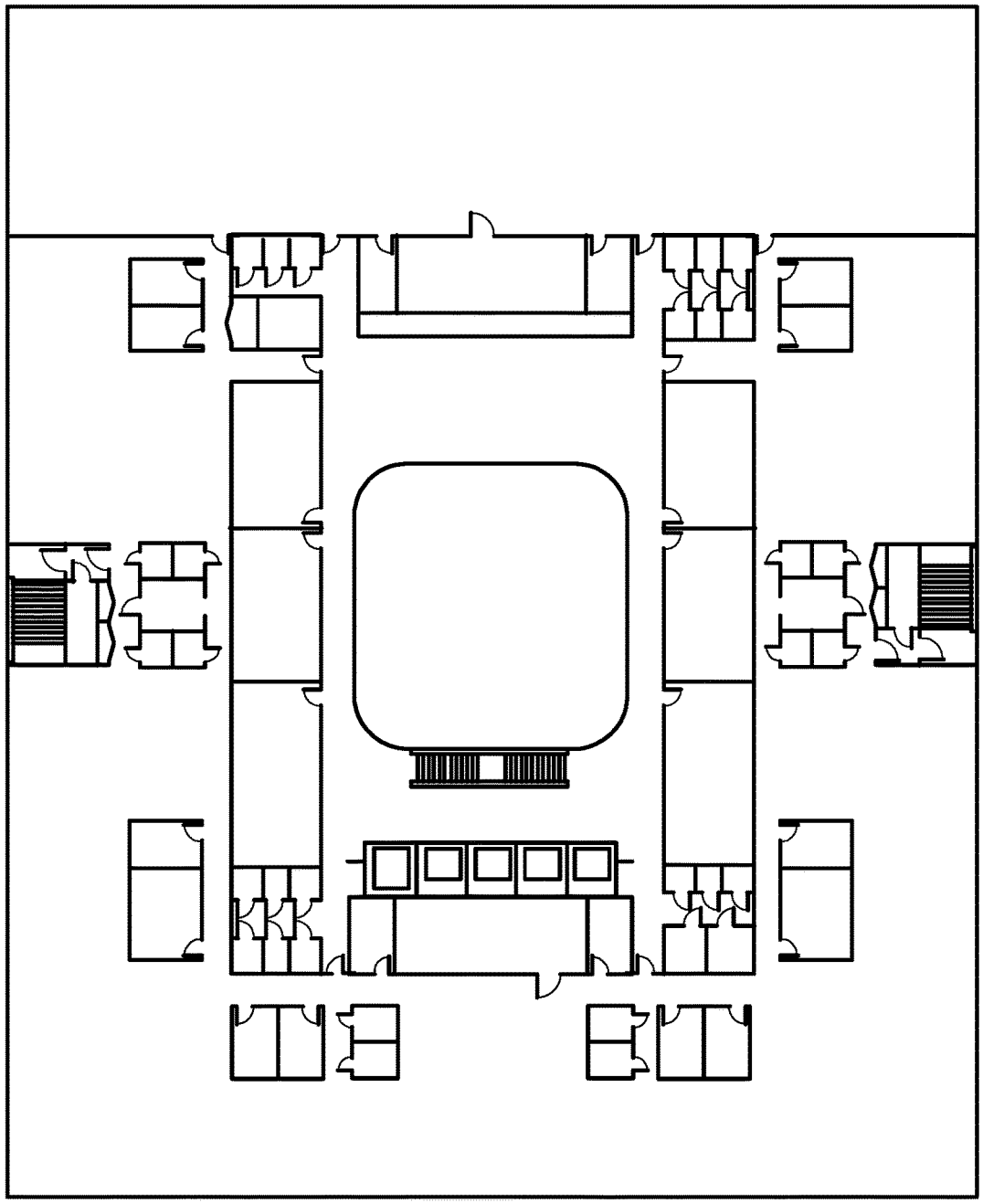
FIG. 1 illustrates a sample floorplan, according to some embodiments of the present disclosure.

As discussed in more detail below, many of the embodiments discussed herein relate to planning and implementing an indoor network deployment. However, these embodiments are not limited thereto and could be applicable in many contexts. In some embodiments, a floorplan is used such as is shown in FIG. 1. This may include outside walls, inside walls and various other structures. Additionally, the materials of these structures may be defined and/or the radio propagation characteristics may be known or derived.

Figure 2:
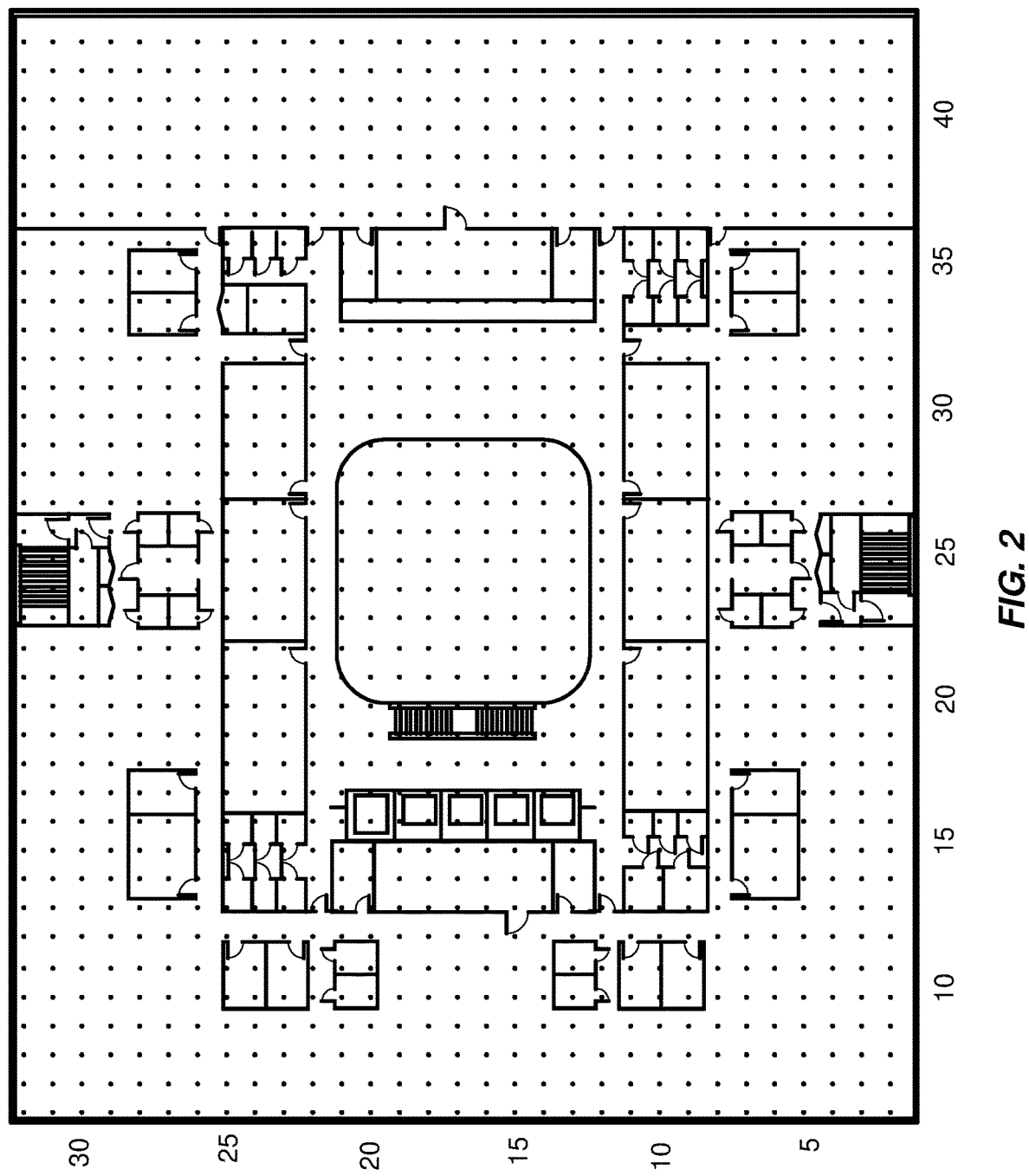
FIG. 2 illustrates an example floorplan that has been segmented into discreet locations, according to some embodiments of the present disclosure.
Figure 3:
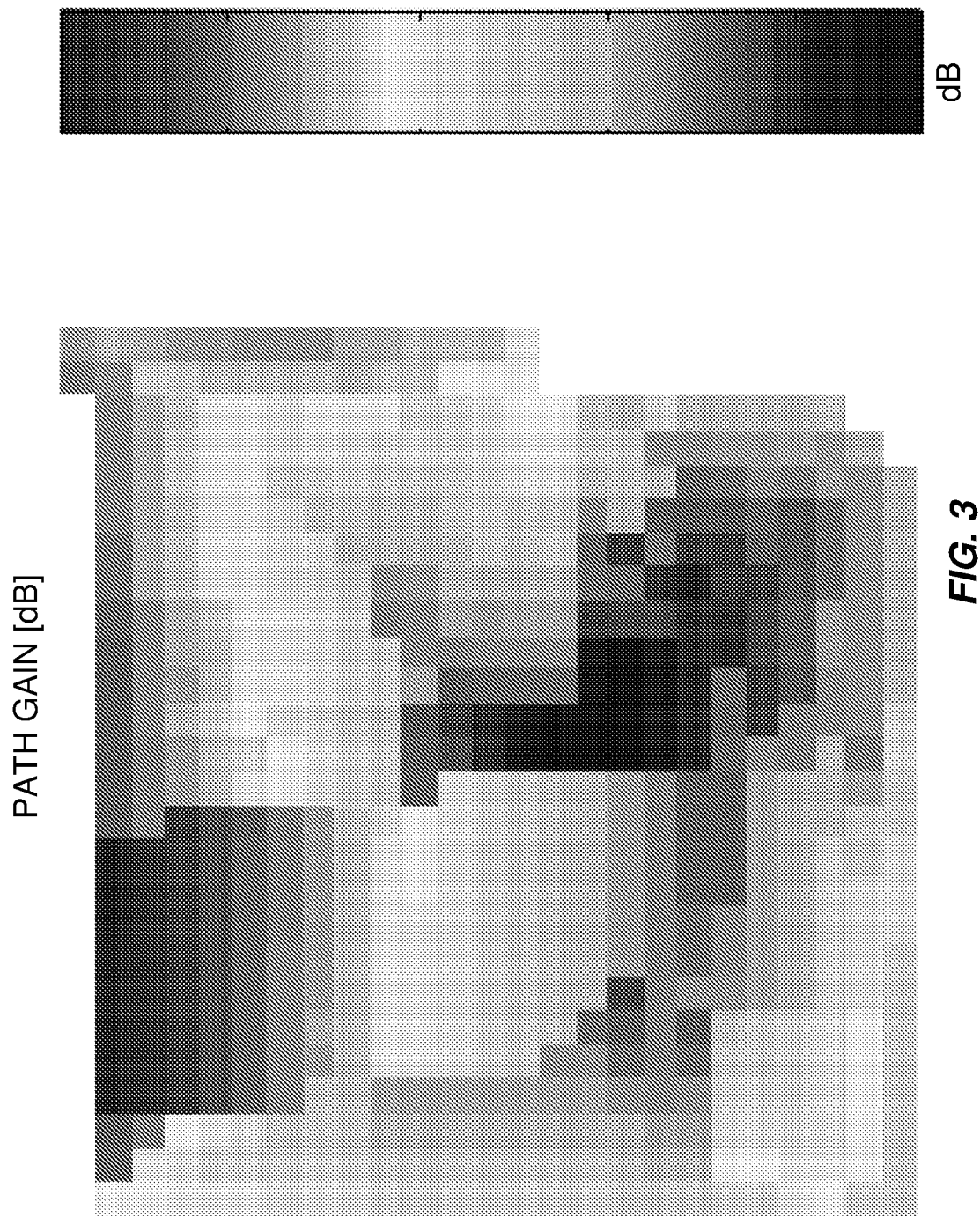
FIG. 3 illustrates an example where path gain is computed for the points in the floorplan, according to some embodiments of the present disclosure.

FIG. 2 illustrates an example floorplan that has been segmented into discrete locations. In this example, many individual points inside the floorplan are assigned x, y coordinates. For instance, the example floor plan illustrates a regular grid of bins, each bin representing the area in close vicinity of the sampling coordinate. If an antenna is placed in this floorplan, various radio characteristics can be calculated for these x, y coordinates. FIG. 3 shows an example where path gain is computed for the points in the floorplan.

Figure 4:
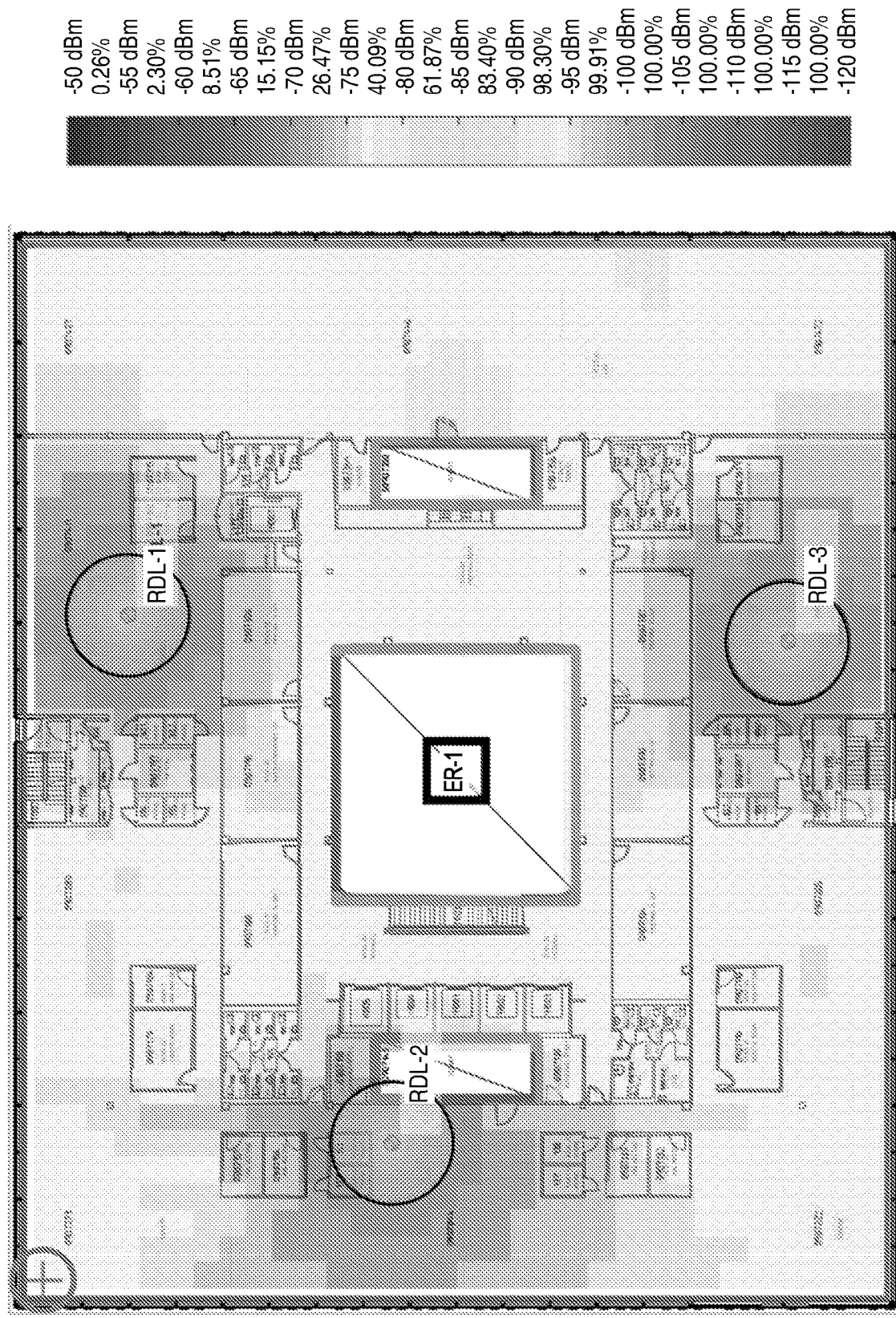
FIG. 4 illustrates a more detailed visualization of the floorplan of FIG. 1 in which there are three antennas at specific locations, according to some embodiments of the present disclosure.

FIG. 4 shows a more detailed visualization of the floorplan of FIG. 1. In this figure, there are three antennas at specific locations, and the values of the signal are shown using different shading.

There currently exist solutions for designing Multiple-Input and Multiple-Input and Multiple-Output (MIMO) networks where antennas are placed in very close proximity (approximately a few centimeters apart). However, existing solutions are not capable of designing a MIMO network where antennas are distributed (i.e., placed far apart from each other) or optimizing the assignment of radio resources to antennas.

Systems and methods for determining an assignment of radio resources to antennas are provided. In some embodiments, a method includes obtaining an antenna deployment including antennas and corresponding locations for the antennas; determining a cell assignment for the antennas such that each antenna is assigned to one cell out of one or more cells; and, based on the cell assignment, determining a resource assignment for the antennas such that each antenna is assigned to one radio resource out of one or more radio resources. This may provide a lightweight and efficient method to design a distributed antenna deployment. The resulting network may be optimized in terms of the total area where a high rank is achieved.

Figure 5:
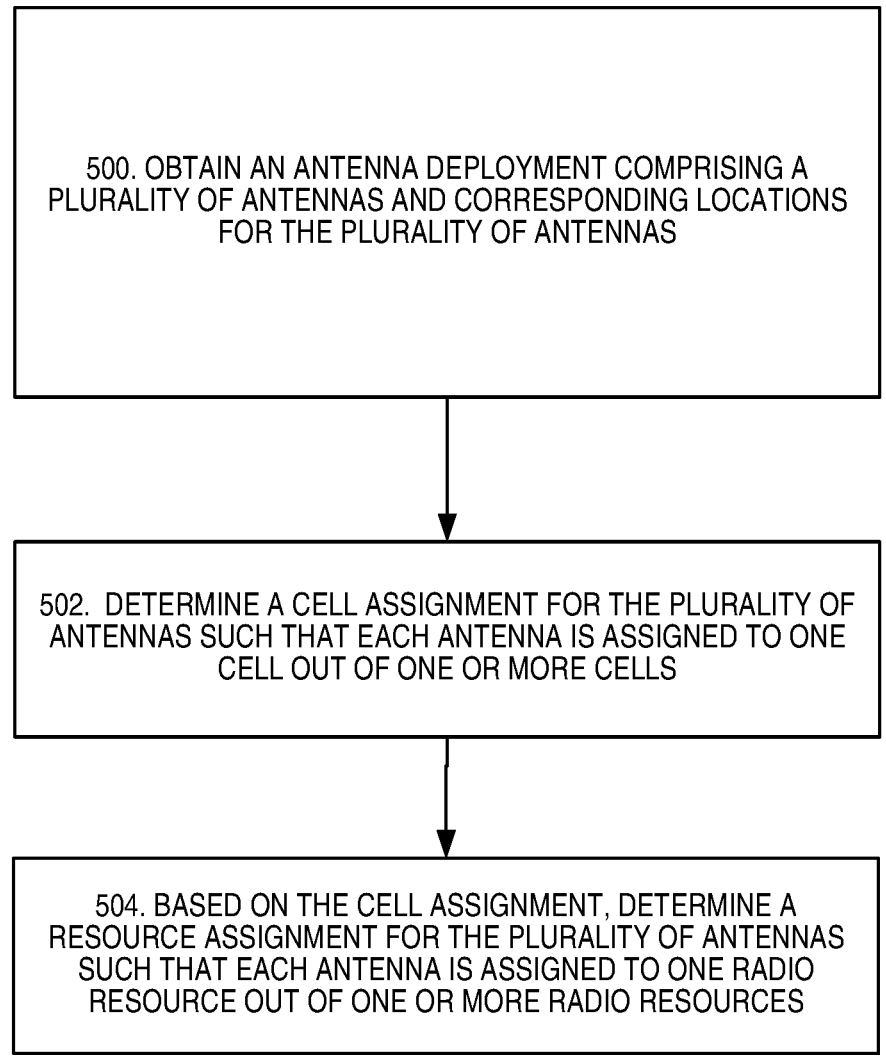
FIG. 5 illustrates a method for determining an assignment of radio resources to antennas, according to some embodiments of the present disclosure.

FIG. 5 illustrates a method for determining an assignment of radio resources to antennas. First, an antenna deployment including antennas and corresponding locations for the antennas is obtained (step 500). Then, a cell assignment for the antennas is determined such that each antenna is assigned to one cell out of one or more cells (step 502). Based on the cell assignment, a resource assignment for the antennas is determined such that each antenna is assigned to one radio resource out of one or more radio resources (step 504).

In some embodiments, the method takes an antenna deployment as an input. This input can be user-defined or automatically generated by an optimization algorithm. The x and y coordinates of the antennas and the path loss of the deployment area are used to compute the following outputs: assignment of antennas to radio resources (also referred to as data streams) and cells. In an N×N MIMO network, each cell transmits N data streams. Antennas can only transmit a single, unique data stream; as such, data streams must be assigned to antennas optimally such that users see the maximum benefit of a MIMO network. MIMO network performance is maximized when a good signal is received from each unique data stream.

Figure 6:
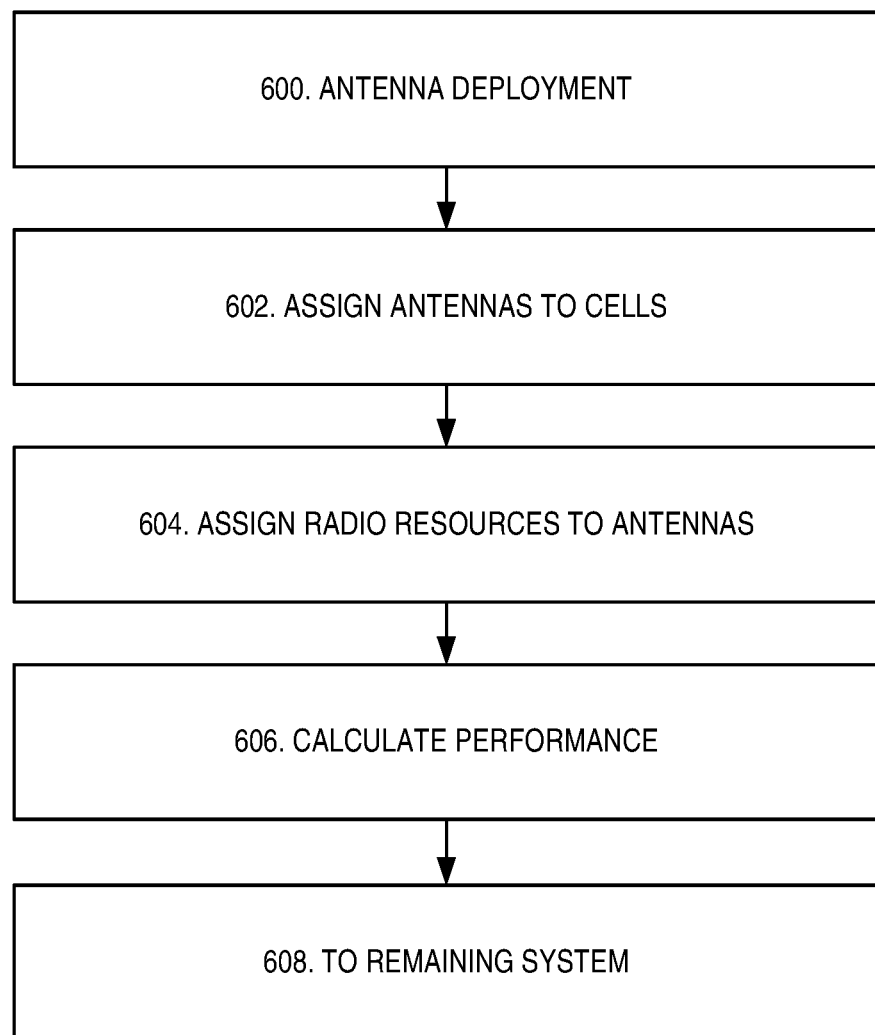
FIG. 6 illustrates an integration of some current embodiments with an existing deployment tool, according to some embodiments of the present disclosure.

To evaluate the solution that is proposed, the Ericsson Indoor Planner (EIP) tool is used to generate an antenna deployment. The solution is inserted after the deployment step and assigns radio resources to antennas such that the total area covered by N antennas is optimized. FIG. 6 illustrates an integration of some current embodiments with an existing deployment tool, according to some embodiments. Given an existing antenna deployment such as a Distributed Antenna System (DAS) head deployment, each head is assigned first to a cell and then to a radio; via the processes depicted in FIGS. 7 and 8. Starting with an antenna deployment (step 600), antennas are assigned to cells (step 602). Then radio resources are assigned to the antennas (step 604). The performance can then be calculated (step 606) and the method can return to some remaining system (step 608).

Figure 7:
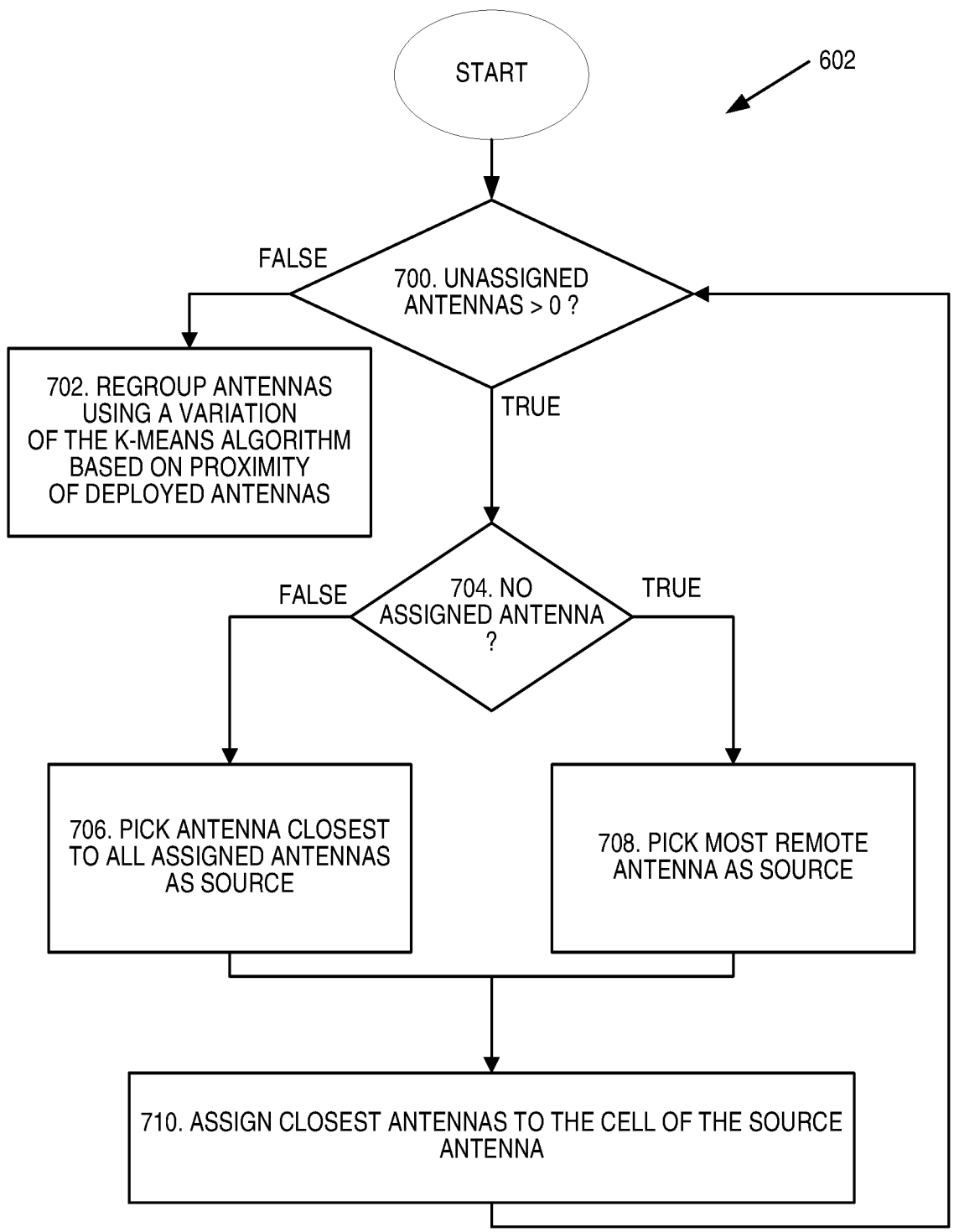
FIG. 7 illustrates a method of operation, according to some embodiments.

FIG. 7 illustrates a method of operation, according to some embodiments. Given an existing antenna deployment, the first step is to assign each antenna to a cell, such as in step 602 as described in this section. The deployment method is irrelevant to the following process; the deployment can be user defined or automatically generated. The cell assignment is optimized to minimize the cell boundaries, by creating as dense cells as possible.

To create these optimized cells, antennas are initially grouped together. Hereinafter, cell groups will be referred to as clusters. Clusters are initially composed of antennas that have the highest degree of proximity to each other. Here, proximity can be defined as nearest in space or smallest path loss. Cluster sizes are limited by the antenna capacity of a cell (this is a user-defined input). If there are unassigned antennas (step 700), the following steps are used to form the initial clusters:

1. Find the antenna (source antenna) that is closest to the point defined by the minimum x and the minimum y coordinates of all the antennas not assigned to clusters (steps 706 and 708).
2. Form a cluster by grouping together the N closest antennas, not assigned to clusters, to the cell of the source antenna (where N is the antenna capacity of a cell) (step 710).
3. Repeat Steps 1 & 2 until all antennas have been assigned to clusters (step 704).

Clusters are characterized by their centroid. The centroid of a cluster is calculated to be the point defined by the average x and y positions of all antennas in that cluster.

Figure 8:
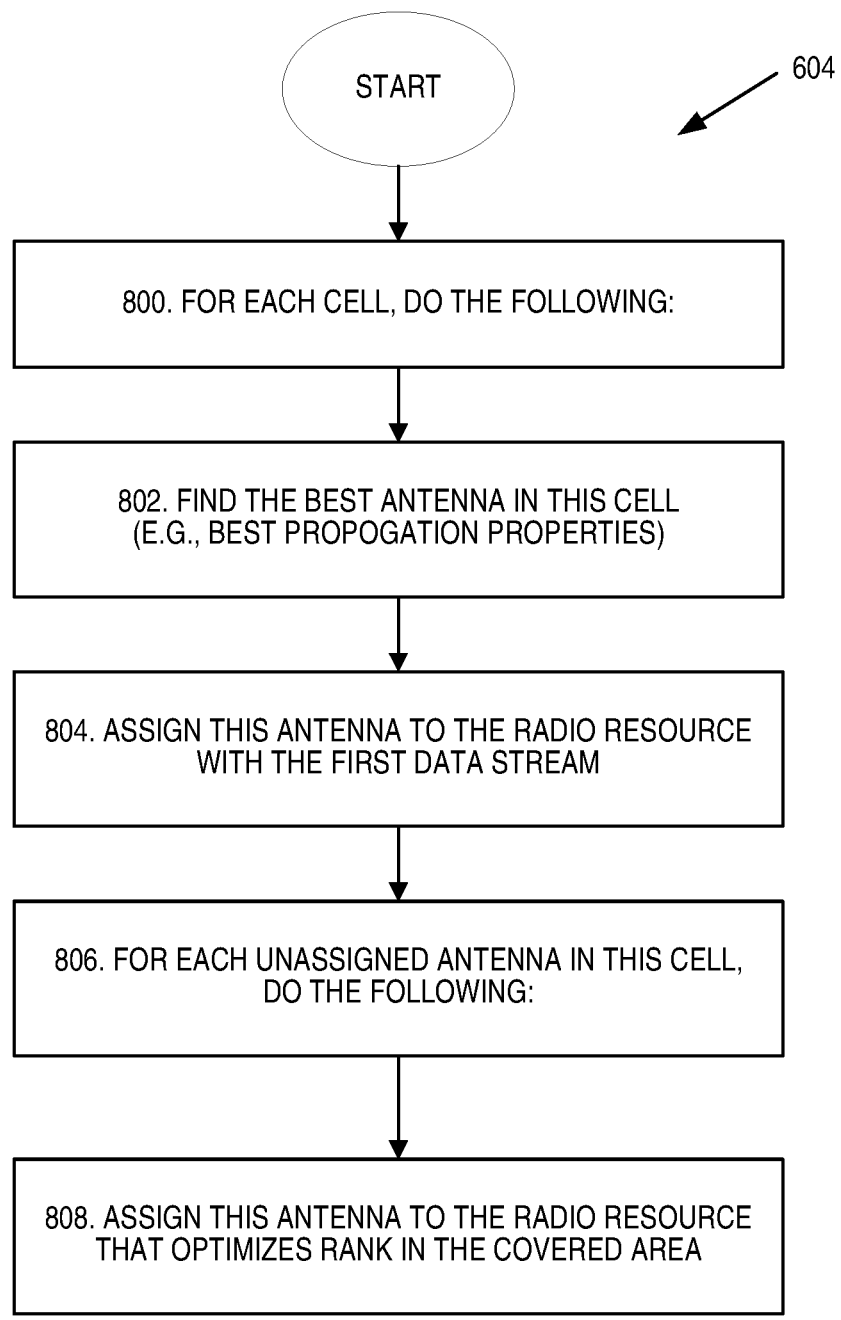
FIG. 8 illustrates a method of operation, according to some embodiments of the present disclosure.

Once all antennas have been assigned to a cluster, they are redistributed by using a variation of the K-means clustering algorithm. The redistribution process follows (step 702):

1. The antenna with the worst proximity to its assigned cluster's centroid is found.
2. This antenna is then assigned to the cluster with the highest degree of proximity (i.e. whose centroid is closest to this antenna).
3. If the new cluster is not at capacity, this assignment is kept. If the new cluster is at capacity, the antenna in the new cluster, closest to the centroid of the old cluster, is placed in the old cluster.
4. The centroids of the new clusters are calculated.
   a. If the total distance of the antennas to their clusters' centroids has not decreased, the assignment is reverted. This process is repeated from Step 2, using the antenna with the next worst proximity.
   b. Otherwise, repeat process from Step 1
5. The process is terminated once all antennas have been examined, or a user defined number of iterations have passed FIG. 8 illustrates a method of operation according to some embodiments. Given an existing antenna deployment and cell assignment, the next step of the solution is to assign radios/data streams to antennas, so as to maximize the areas served by N radios/data streams in an N×N MIMO network. The following steps are taken to achieve this result:

1. For each cell (step 800) find the antenna with the best propagation (step 802) and assign it to the radio resource with the first data stream (step 804).
2. For the rest of the unassigned antennas (step 806), iterate through all antenna and data stream combinations. Find the combination that maximizes the area in which M data stream signals are received (where M=# of unique data streams that have been assigned).
3. Examine all unassigned antennas in this cell and assign the antenna whose covered area overlaps the most with the area(s) covered by the greatest number of data streams (step 808).
4. Repeat Step 804 until all antennas in this cell have been assigned data streams.
5. Repeat Steps 802, 804, and 806 for all cells.

For illustrative purposes, pseudocode for performing some of the methods discussed herein is provided. This only represents an example implementation and the current disclosure is not limited thereto.

```
[ ]=main(deployment, xyArea, pathGain, TxPower,
    nStreams, cellCapacity) {
/*
deployment is either a user input OR is auto-generated
pre-calculated variables:
* xyArea=x & y coordinates for every point in the Area of
    Interest (AoI)
* pathGain=path gain from point A to point B, where A and
    B are both points in the deployment area
constants: (can be user-defined)
* TxPower=transmitting power of one antenna
* nStreams=value of N if objective is N×N MIMO
* cellCapacity=maximum antennas in one cell
*/
deployment=assignAntennasToCells (deployment, path-
    Gain, cellCapacity)
for (cell=1; cell<=max(deployment.cellID)) {
    cellMask=(deployment.cellID==cell)
    deployment[cellMask]=assignRadiosToAntennas  (de-
        ployment[cellMask], pathGain, TxPower, xyArea,
        nStreams)
}
}
[deployment]=assignAntennasToCells (deployment, path-
    Gain, cellCapacity) {
/*
deployment: x and y coordinates of all the antennas
    deployed in deployment area coordinate=(deployment
    [index].x, deployment[index].y)
pathGain: path gain from point A to point B, where A and B
    are both points in the deployment area
pathGain[index_A, index_B]=path gain from point A to
    point B
cellCapacity: the number of antennas that can be placed
    within 1 cell
deployment: same as before PLUS the antenna to cell
    assignment
deployment[index].cellID=cell ID of antenna at (deploy-
    ment.x[index], deployment.y[index])
NOTES:
* the terms 'cell' & 'cluster' are used interchangeably
*/
cellID=0
unassignedAntennas=deployment
numberOfUnassignedAntennas=count(unassignedAnten-
    nas)
/* create initial clusters */
while (numberOfUnassignedAntennas>0) {
    cellID++
    sourcePoint.x=min(unassignedAntennas.x)
    sourcePoint.y=min(unassignedAntennas.y)
    /* find first single (1) antenna closest to source point */
    sourceAntenna=unassignedAntennas.closest(source-
        Point, 1)
    deployment[sourceAntenna].cellID=cellID
    unassignedAntennas.pop(sourceAntenna)
    /* find the first N antennas closest to source antenna,
        where N=cellCapacity−1
    if there are less than N antennas remaining, return all
        remaining antennas */
    closestAntennas=unassignedAntennas.closest(sourceAn-
        tenna, cellCapacity−1)
```

```
deployment[closestAntennas].cellID=cellID
unassignedAntennas.pop(closestAntennas)
numberOfUnassignedAntennas=count(unassignedAnten-
    nas)
}
/* instead of finding the distance from antennas to centroids,
    one could find the path loss from antennas to centroids
    maximum distance to centroid is equivalent to smallest
    path gain to centroid */
distanceToCentroid=calculateCentroids(deployment)
N=1
while (N==count(deployment)) {
    /* find which antenna has the lowest degree of proximity
        (max distance/smallest path gain to its centroid) to its
        cell's centroid */
    worstAntenna=deployment[indexOfNthMaximum(dis-
        tanceToCentroid, N)]
    distanceToBestCell=INF;
    /* find the centroid & cluster that is closest to the worst
        antenna */
    for (cell=1; cell<=max(deployment.cellID)) {
        if    (distanceToBestCell>distanceBetween(worstAn-
            tenna, centroid[cell])) {
            distanceToBestCell=distanceBetween(worstAn-
                tenna, centroid[cell])
            closestCell=cell
        }
    }
    /* if the closest cluster to the worst antenna is at capacity,
        find the antenna in that cluster that is furthest from the
        centroid and place it in the cluster of the worst ant-
        enna */
    if (count(deployment.cellID=closestCell)==cellCapacity)
    {
        /* select all antennas in the closest cell to the worst
            antenna */
        clusterMask=(deployment.cellID==closestCell)
        /* select the antenna furthest from the closest cell's (to
            the worst antenna) centroid */
        antennaToSwap=deployment[indexOfNthMaximum
            (distanceToCentroid[clusterMask], 1)]
        /* swap the cells of the antennaToSwap and the
            worstAntenna */
        deployment.swap(antennaToSwap, worstAntenna)
        /* recalculate the distance to the centroids for all
            antennas and their cells */
        distanceToCentroidAfterSwap=calculateCentroids(de-
            ployment)
        /* if the new distances to centroids is less than the old
            distance to centroids then this is a successful swap,
            otherwise revert the swap */
        if  (sum(distanceToCentroidAfterSwap)<sum(distanc-
            eToCentroid)) {
            distanceToCentroid=distanceToCentroidAfterSwap
            /* swap was successful, in next iteration look for
                worst antenna */
            N=1
        } else {
            deployment.swap(antennaToSwap, worstAntenna)
            /* swap was unsuccessful, try again with NEXT
                worst antenna */
            N++
        }
    } else {
        /* save the current cell of the worst antenna */
        oldCell=deployment[worstAntenna].cellID
        /* place the worst antenna in the cell closest to it */
        deployment[worstAntenna].cellID=closestCell
        /* recalculate the distance to the centroids for all
            antennas and their cells */
        distanceToCentroidAfterSwap=calculateCentroids(de-
            ployment)
        /* if there is an improvement in the distance to cen-
            troids, keep the assignment */
        if  (sum(distanceToCentroidAfterSwap)<sum(distanc-
            eToCentroid)) {
            distanceToCentroid=distanceToCentroidAfterSwap
            /* swap was successful, in next iteration look for
                worst antenna */
            N=1
        } else {
            deployment[worstAntenna].cellID=oldCell
            /* swap was unsuccessful, try again with NEXT
                worst antenna */
            N++
        }
    }
}
[deployment]=assignRadiosToAntennas (deployment, path-
    Gain, TxPower, xyArea, nStreams) {
    /*
    deployment: x and y coordinates AND cell IDs of all the
        antennas deployed in deployment area
    pathGain: path gain from point A to point B, where A and
        B are both points in the deployment area
    pathGain[index_A, index_B]=path gain from point A to
        point B
    TxPower: the transmit power of one antenna
    xyArea: x & y coordinates for every point in the Area of
        Interest (AoI)
    xyArea[index]=(x[index], y[index])
    nStreams: the number of unique data streams that radio in
        this network produce
    e.g. if goal is 4×4 MIMO, nStreams=4
    deployment: same as before PLUS the radios to antenna
        assignment
    deployment.stream[index]=stream of antenna at (deploy-
        ment.x[index],
    deployment.y[index])
NOTES:
* the terms 'radios', 'radio resources', 'data streams', &
    'streams' are used interchangeably
*/
/* signal from point A to point B, where A is a transmitting
    point and B is a receiving point, in the deployment
    area */
signal=TxPower*pathGain
for (antenna in deployment) {
    /* find percentage of points in the AoI that receive some
        signal from this antenna */
    coverage[antenna]=count(signal[(antenna.x, antenna.y),
        xyArea])/count(xyArea)
}
/* bestAntenna is the one that transmits signal to the most
    points in AoI */
bestAntenna=deployment[indexOfNthMaximum(cover-
    age, 1)]
/* assign best antenna to transmit data stream 1 */
deployment[bestAntenna].stream=1
/* all antennas but the bestAntenna are still unassigned */
unassignedAntennas=deployment[!bestAntenna]
/* need to assign a stream to all antennas, so loop until all
    antennas have been assigned a stream */
```

```
while (count(unassignedAntennas)>0) {
    /* for each unassigned antenna . . . */
    for (antenna in unassignedAntennas) {
        /* . . . temporarily assign it to each possible
            stream . . . */
        for (stream=1; stream<=nStreams) {
            /* . . . and find the areas of overlapping coverage with
                antennas assigned to other streams */
            antenna.stream=stream
            antennaCoveragePerStream[stream]=checkStream-
                Coverage(antenna, deployment[!unassignedAn-
                tennas], nStreams, signal, xyArea)
        }
        /* . . . find which stream assignment results in the most
            stream signals received at the most points in the AoI
            i.e. find the best stream assignment for this antenna */
        for (stream=nStreams; stream>=1) {
            if (sum(antennaCoveragePerStream[1:nStreams,
                stream])>0) {
                bestStream=indexOfNthMaximum(antennaCov-
                    eragePerStream[1:nStreams, stream], 1)
                break
            }
        }
        /* assign the best stream to this antenna */
        antenna.stream=bestStream
        /* store the coverage per number of stream signals
            received, for this antenna/stream combo */
        coveragePerStream[antenna]=antennaCoveragePer-
            Stream[bestStream]
    }
    /* after finding the best stream assignment for each
        unassigned antenna find which antenna results in the
        most stream signals received at the most points in the
        AoI
        i.e. find the best antenna/stream combination */
    for (stream=nStreams; stream>=1) {
        if (sum(coveragePerStream[1:count(unassignedAnten-
            nas), stream])>0) {
            bestAntenna=indexOfNthMaximum(coveragePer-
                Stream[1:count(unassignedAntennas), stream], 1)
            bestStream=unassignedAntennas[bestAntenna]
                .stream
            break
        }
    }
    /* save this antenna/stream combination */
    deployment[bestAntenna].stream=bestStream
    /* remove the newly assigned antenna from the unas-
        signed antennas */
    unassignedAntennas.pop(bestAntenna)
}
}
[coveragePerStream]=checkStreamCoverage(antenna,
    assignedAntennas, nStreams, signal, xyArea) {
    /* returns an array of size nStreams. The Nth element of
        the array is the area
        that receives N unique streams from antennas (antenna &
        assignedAntennas) */
    coveragePerStream=zeros(nStreams)
    assignedAntennas.append(antenna)
    for (stream=1; stream<=nStream) {
        /* find the antennas that are assigned to this stream */
        antennasThisStreamMask=
            (assignedAntennas.stream==stream)
        antennasThisStream=assignedAntennas[antennas-
            ThisStream Mask]
        /* find the summed signal transmitted by all antennas
            assigned to this stream, to every point in the AoI */
        streamSignal[stream]=sum(signal[(antennas-
            ThisStream.x, antennasThisStream.y), xyArea])
        /* streamSignal[stream, (x, y)]=the signal power
            received at (x, y) from antennas transmitting signal
            of stream */
    }
    /* for each position in the AoI */
    for (xy in xyArea) {
        nStreamsReceived=0
        for (stream=1; stream<=nStreams) {
            /* find the number of unique signals received at this
                position */
            if (signal[stream, xy]>0) {
                nStreamsReceived++
            }
        }
        /* increase the number of position covered by nStream-
            sReceived number of data streams */
        coveragePerStream[nStreamsReceived]++
    }
    /* return the ratio of covered area to total area */
    coveragePerStream=coveragePerStream/count(xyArea)
}
[distanceToCentroid]=calculateCentroids(deployment) {
    /* for each cell . . . */
    for (cell=1; cell<=max(deployment.cellID)) {
        /* select all antennas assigned to this cell */
        clusterMask=(deployment.cellID==cell)
        /* this function returns the average x coordinate and
            average y coordinate of the antennas assigned to this
            cell */
        centroid[cell]=deployment[clusterMask].find
            Centroid( )
    }
    for (antenna in deployment) {
        /* for each antenna, find the distance to the centroid of
            its cell */
        distanceToCentroid[antenna]=distanceBetween(an-
            tenna, centroid[antenna.cellID])
    }
}
[index]=indexOfNthMaximum(array, N) {
    /* returns index of Nth maximum of array */
    sortedArray=sort(array)
    index=array.indexOf(sortedArray[N])
}
```

Figure 9:
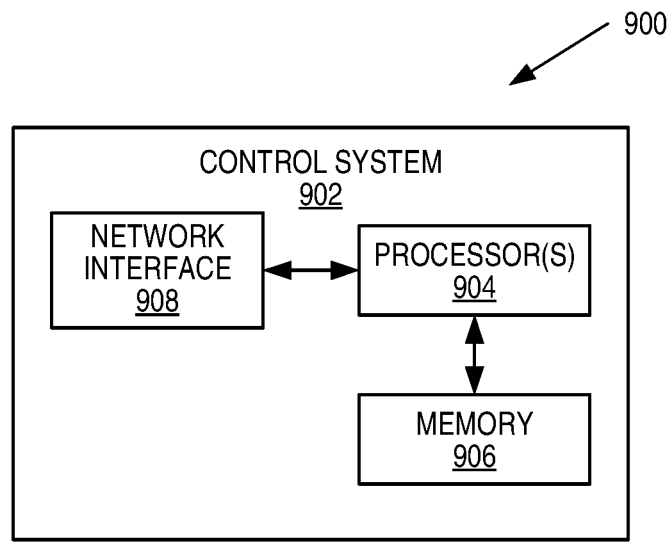
FIG. 9 is a schematic block diagram of a computation node, according to some embodiments of the present disclosure.

FIG. 9 is a schematic block diagram of a computation node 900 according to some embodiments of the present disclosure. As illustrated, the computation node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. The one or more processors 904 operate to provide one or more functions of a computation node 900 as described herein. In some embodiments, the function(s) are implemented in software that is stored, e.g., in the memory 906 and executed by the one or more processors 904.

Figure 10:
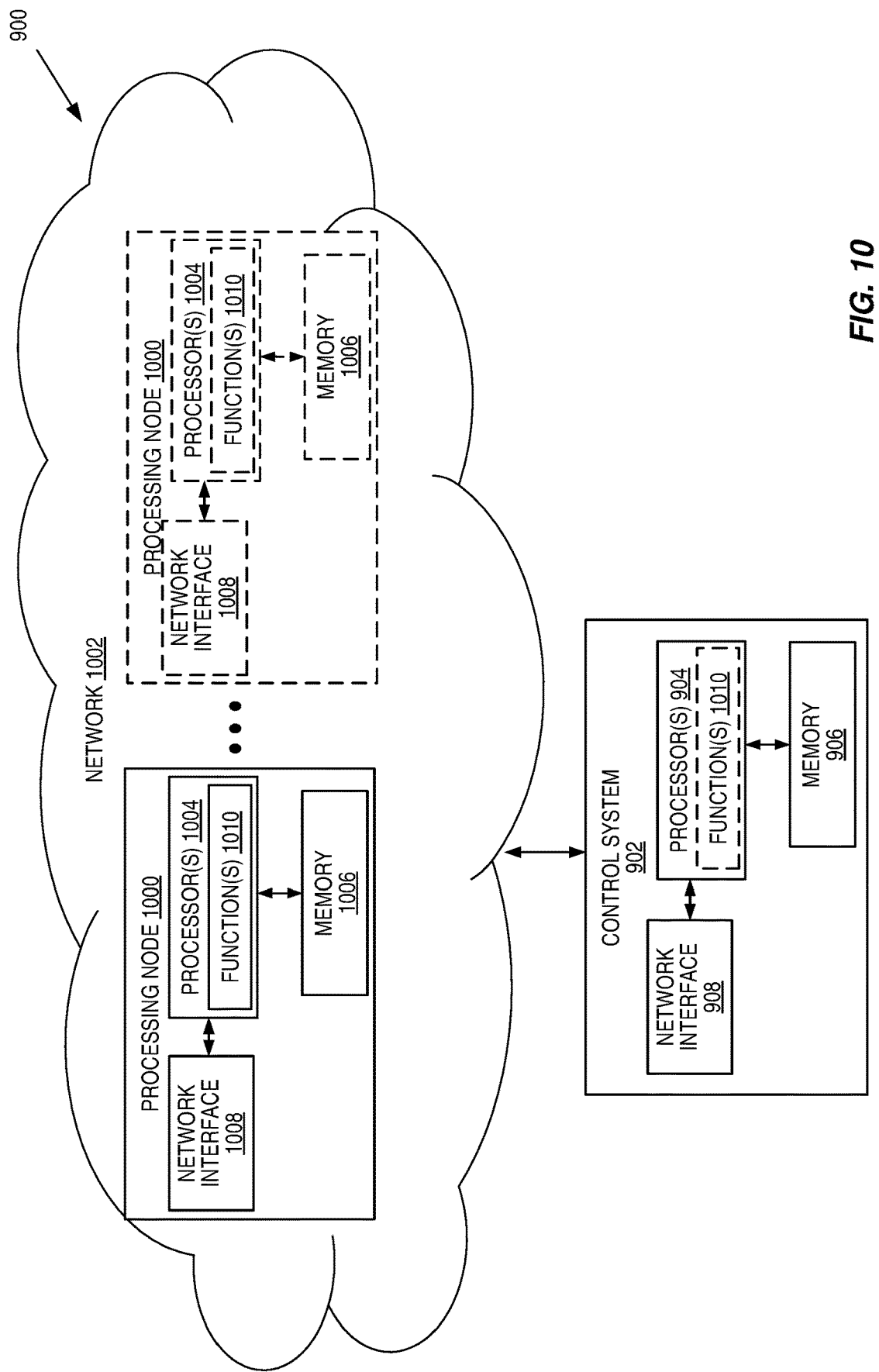
FIG. 10 is a schematic block diagram that illustrates a virtualized embodiment of the computation node according to some embodiments of the present disclosure.

FIG. 10 is a schematic block diagram that illustrates a virtualized embodiment of the computation node 900 according to some embodiments of the present disclosure. This discussion is equally applicable to other types of network nodes or computation nodes. Further, other types of network nodes and computation nodes may have similar virtualized architectures.

As used herein, a "virtualized" computation node is an implementation of the computation node 900 in which at least a portion of the functionality of the computation node 900 is implemented as a virtual component(s) (e.g., via a virtual machine(s) executing on a physical processing node(s) in a network(s)). As illustrated, in this example, the computation node 900 includes the control system 902 that includes the one or more processors 904 (e.g., CPUs, ASICs, FPGAs, and/or the like), the memory 906, and the network interface 908, as described above. The control system 902 is connected to the radio unit(s) 910 via, for example, an optical cable or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, functions 1010 of the computation node 900 described herein are implemented at the one or more processing nodes 1000 or distributed across the control system 902 and the one or more processing nodes 1000 in any desired manner. In some particular embodiments, some or all of the functions 1010 of the computation node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010.

In some embodiments, a computer program including instructions which, when executed by at least one processor, causes the at least one processor to carry out the functionality of computation node 900 or a node (e.g., a processing node 1000) implementing one or more of the functions 1010 of the computation node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
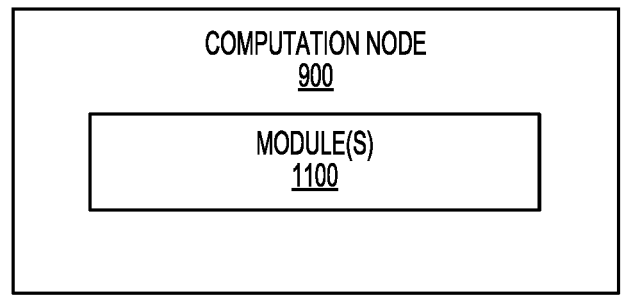
FIG. 11 is a schematic block diagram of the computation node according to some other embodiments of the present disclosure.

FIG. 11 is a schematic block diagram of the computation node 900 according to some other embodiments of the present disclosure. The computation node 900 includes one or more modules 1100, each of which is implemented in software. The module(s) 1100 provide the functionality of the computation node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

1. A method performed by a computation node (900) for determining an assignment of radio resources to antennas, the method comprising:
   obtaining (500, 600) an antenna deployment comprising a plurality of antennas and corresponding locations for the plurality of antennas;
   determining (502, 602) a cell assignment for the plurality of antennas such that each antenna is assigned to one cell out of one or more cells; and
   based on the cell assignment, determining (504, 604) a resource assignment for the plurality of antennas such that each antenna is assigned to one radio resource out of one or more radio resources.

2. The method of embodiment 1 further comprising a step of calculating (606) a performance metric of the antenna deployment based on the cell assignment and the resource assignment for the plurality of antennas in the antenna deployment.

3. The method of any of embodiments 1 to 2, wherein obtaining the antenna deployment comprises receiving the antenna deployment.

4. The method of any of embodiments 1 to 2, wherein obtaining the antenna deployment comprises determining the antenna deployment by the computation node.

5. The method of any of embodiments 1 to 4, wherein determining the cell assignment for the plurality of antennas comprises:
   determining (706, 708) a source antenna; and
   assigning (710) a closest antenna to the source antenna to a cell corresponding to the source antenna.

6. The method of embodiment 5, wherein the determining and assigning steps are repeated until each of the plurality of antennas is assigned to one cell out of the one or more cells.

7. The method of any of embodiments 5 to 6, wherein determining the source node comprises:
   when none of the plurality of antennas is assigned to a cell, determining (708) a most remote antenna to be the source antenna; and
   when at least one of the plurality of antennas is assigned to a cell, determining (706) an antenna that is closest to all assigned antennas of the plurality of antennas to be the source antenna.

8. The method of any of embodiments 1 to 7, wherein a proximity of a first antenna to a second antenna is based on a physical location of the first antenna and the second antenna.

9. The method of any of embodiments 1 to 8, wherein the proximity of the first antenna to the second antenna is based on a propagation property of at least one of the first antenna and the second antenna.

10. The method of any of embodiments 5 to 9, wherein assigning the closest antenna to the source antenna to the cell corresponding to the source antenna further comprises basing the assignment on a maximum number of antennas for a given cell.

11. The method of any of embodiments 1 to 10, wherein determining the cell assignment for the plurality of antennas further comprises regrouping (702) the plurality of antennas using a variation of the K-means algorithm based on proximity of the plurality of antennas.

12. The method of any of embodiments 1 to 11, wherein determining the resource assignment for the plurality of antennas comprises, for one cell out of the one or more cells:
    determining (802) a best antenna in the one cell;
    assigning (804) the best antenna to one radio resource out of the one or more radio resources that corresponds to a first data stream; and
    for each (806) unassigned antenna of the plurality of antennas, assigning (808) one of the other unassigned antennas of the plurality of antennas to a radio resource out of one or more radio resources that optimizes rank in the covered area.

13. The method of embodiment 5, wherein the determining and assigning steps are repeated until each of the one or more cells has been processed.

14. The method of any of embodiments 12 to 13, wherein the determining the best antenna in the one cell comprises determining the best antenna in the one cell based on propagation properties of the plurality of antennas.

15. A computation node (900) for determining an assignment of radio resources to antennas, the wireless device comprising:
    processing circuitry (904, 906, 1004, 1006) configured to perform any of the steps of any of embodiments 1 to 14; and
    power supply circuitry configured to supply power to the computation node (900).

At least some of the following abbreviations may be used in this disclosure. If there is an inconsistency between abbreviations, preference should be given to how it is used above. If listed multiple times below, the first listing should be preferred over any subsequent listing(s).

AoI Area of Interest
ASIC Application Specific Integrated Circuit
CPU Central Processing Unit
DAS Distributed Antenna System
DSP Digital Signal Processor
EIP Ericsson Indoor Planner
FPGA Field Programmable Gate Array
MIMO Multiple Input Multiple Output
RAM Random Access Memory
ROM Read Only Memory
SINR Signal-to-Interference-plus-Noise Ratio
SNR Signal-to-Noise-Ratio Those skilled in the art will recognize improvements and modifications to the embodiments of the present disclosure. All such improvements and modifications are considered within the scope of the concepts disclosed herein.

What is claimed is:

1. A method performed by a computation node for determining an assignment of radio resources to antennas, the method comprising:
    obtaining an antenna deployment comprising a plurality of antennas and corresponding locations for the plurality of antennas;
    determining a cell assignment for the plurality of antennas such that each antenna is assigned to one cell out of one or more cells; and
    based on the cell assignment, determining a resource assignment for the plurality of antennas such that each antenna is assigned to one radio resource out of one or more radio resources;
    wherein determining the cell assignment for the plurality of antennas comprises:
        determining a source antenna; and
        assigning a closest antenna to the source antenna to a cell corresponding to the source antenna;
    wherein determining the source antenna comprises:
        when none of the plurality of antennas is assigned to a cell, determining a most remote antenna to be the source antenna; and
        when at least one of the plurality of antennas is assigned to a cell, determining an antenna that is closest to all assigned antennas of the plurality of antennas to be the source antenna.

2. The method of claim 1 further comprising:
    calculating a performance metric of the antenna deployment based on the cell assignment and the resource assignment for the plurality of antennas in the antenna deployment.

3. The method of claim 1, wherein obtaining the antenna deployment comprises receiving the antenna deployment.

4. The method of claim 1, wherein obtaining the antenna deployment comprises determining the antenna deployment by the computation node.

5. The method of claim 1, wherein determining the cell assignment for the plurality of antennas comprises:
    determining a source antenna; and
    assigning a closest antenna to the source antenna to a cell corresponding to the source antenna.

6. The method of claim 5, wherein the determining and assigning steps are repeated until each of the plurality of antennas is assigned to one cell out of the one or more cells.

7. The method of claim 1, wherein a proximity of a first antenna to a second antenna is based on a physical location of the first antenna and the second antenna.

8. The method of claim 1, wherein the proximity of the first antenna to the second antenna is based on a propagation property of at least one of the first antenna and the second antenna.

9. The method of claim 5, wherein assigning the closest antenna to the source antenna to the cell corresponding to the source antenna further comprises basing the cell assignment on a maximum number of antennas for a given cell.

10. The method of claim 1, wherein determining the cell assignment for the plurality of antennas further comprises regrouping the plurality of antennas using a variation of a K-means algorithm based on proximity of the plurality of antennas.

11. The method of claim 1, wherein determining the resource assignment for the plurality of antennas comprises, for one cell out of the one or more cells:
    determining a best antenna in the one cell;
    assigning the best antenna to one radio resource out of the one or more radio resources that corresponds to a first data stream; and
    for each unassigned antenna of the plurality of antennas, assigning one of the other unassigned antennas of the plurality of antennas to a radio resource out of the one or more radio resources that optimizes rank in the covered area.

12. The method of claim 5, wherein the determining and assigning steps are repeated until each of the one or more cells has been processed.

13. The method of claim 11, wherein the determining the best antenna in the one cell comprises determining the best antenna in the one cell based on propagation properties of the plurality of antennas.

14. A computation node for determining an assignment of radio resources to antennas, the computation node comprising:
processing circuitry configured to:
obtain an antenna deployment comprising a plurality of antennas and corresponding locations for the plurality of antennas;
determine a cell assignment for the plurality of antennas such that each antenna is assigned to one cell out of one or more cells; and
based on the cell assignment, determine a resource assignment for the plurality of antennas such that each antenna is assigned to one radio resource out of one or more radio resources;
wherein determining the cell assignment for the plurality of antennas comprises the processing circuitry being configured to:
determine a source antenna; and
assign a closest antenna to the source antenna to a cell corresponding to the source antenna;
wherein determining the source antenna comprises:
when none of the plurality of antennas is assigned to a cell, determine a most remote antenna to be the source antenna; and
when at least one of the plurality of antennas is assigned to a cell, determine an antenna that is closest to all assigned antennas of the plurality of antennas to be the source antenna.

15. The computation node of claim 14 wherein the processing circuitry is further configured to:
calculate a performance metric of the antenna deployment based on the cell assignment and the resource assignment for the plurality of antennas in the antenna deployment.

16. The computation node of claim 14, wherein the processing circuitry being configured to obtain the antenna deployment comprises the processing circuitry being configured to receive the antenna deployment.

17. The computation node of claim 14, wherein the processing circuitry being configured to obtain the antenna deployment comprises the processing circuitry being configured to determine the antenna deployment by the computation node.

18. The computation node of claim 14, wherein the processing circuitry being configured to determine the cell assignment for the plurality of antennas comprises the processing circuitry being configured to:
determine a source antenna; and
assign a closest antenna to the source antenna to a cell corresponding to the source antenna.

19. The computation node of claim 18, wherein the determining and assigning steps are repeated until each of the plurality of antennas is assigned to one cell out of the one or more cells.

20. The computation node of claim 14, wherein a proximity of a first antenna to a second antenna is based on a physical location of the first antenna and the second antenna.

21. The computation node of claim 14, wherein the proximity of the first antenna to the second antenna is based on a propagation property of at least one of the first antenna and the second antenna.

22. The computation node of claim 18, wherein the processing circuitry being configured to assign the closest antenna to the source antenna to the cell corresponding to the source antenna further comprises the processing circuitry being configured to base the cell assignment on a maximum number of antennas for a given cell.

23. The computation node of claim 14, wherein the processing circuitry being configured to determine the cell assignment for the plurality of antennas further comprises the processing circuitry being configured to regroup the plurality of antennas using a variation of a K-means algorithm based on proximity of the plurality of antennas.

24. The computation node of claim 14, wherein the processing circuitry being configured to determine the resource assignment for the plurality of antennas comprises, for one cell out of the one or more cells, the processing circuitry being configured to:
determine a best antenna in the one cell;
assign the best antenna to one radio resource out of the one or more radio resources that corresponds to a first data stream; and
for each unassigned antenna of the plurality of antennas, assign one of the other unassigned antennas of the plurality of antennas to a radio resource out of one or more radio resources that optimizes rank in the covered area.

25. The computation node of claim 18, wherein the determining and assigning steps are repeated until each of the one or more cells has been processed.

26. The computation node of claim 24, wherein the processing circuitry being configured to determine the best antenna in the one cell comprises the processing circuitry being configured to determine the best antenna in the one cell based on propagation properties of the plurality of antennas.

27. A method performed by a computation node for determining an assignment of radio resources to antennas, the method comprising:
obtaining an antenna deployment comprising a plurality of antennas and corresponding locations for the plurality of antennas;
determining a cell assignment for the plurality of antennas such that each antenna is assigned to one cell out of one or more cells; and
based on the cell assignment, determining a resource assignment for the plurality of antennas such that each antenna is assigned to one radio resource out of one or more radio resources;
wherein determining the cell assignment for the plurality of antennas further comprises regrouping the plurality of antennas using a variation of a K-means algorithm based on proximity of the plurality of antennas.

* * * * *